United States Patent [19]
Garmaise et al.

[11] 3,878,223
[45] Apr. 15, 1975

[54] N-SUBSTITUTED ACRYLAMIDES

[75] Inventors: David Lyon Garmaise, Montreal; Gerard Yvon Paris, Duvernay, Quebec, both of Canada

[73] Assignee: Abbott Laboratories, North Chicago, Ill.

[22] Filed: Mar. 12, 1973

[21] Appl. No.: 340,622

[52] U.S. Cl.......... 260/310 R; 260/307 H; 260/311; 260/326.2; 424/272; 424/273; 424/274
[51] Int. Cl............................................... C07d 49/20
[58] Field of Search ................................. 260/310 R

[56]  References Cited
UNITED STATES PATENTS
3,707,477   12/1972   Ost et al.......................... 260/310 R OTHER PUBLICATIONS
Firestine, Chem. Chem. Abst., Vol. 68, No. 29696w (1968). QD1.A51.

Kuderna et al., J. Org. Chem., Vol. 36, pages 3506–3510 (1971), QD241.J6.

Takeshi et al., Chem. Abst., Vol. 75, No. 130156q (1971). QD1.A51.

*Primary Examiner*—Natalie Trousof
*Attorney, Agent, or Firm*—Paul D. Burgauer; Robert L. Niblack

[57]  ABSTRACT

Acrylamides of N-containing heterocyclic moieties that optionally carry a further hetero atom adjacent to the said N and/or methyl substituent(s) on said hetero ring and at least one chlorine atom adjacent to the double bond of the acrylic moiety have been found to have anti-inflammatory properties at reasonably low dosage levels.

2 Claims, No Drawings

N-SUBSTITUTED ACRYLAMIDES

DETAILED DESCRIPTION OF THE INVENTION

The new compound of the formula:

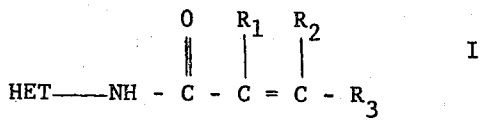

$$\text{HET}\text{—}\text{NH} - \overset{\overset{\text{O}}{\|}}{\text{C}} - \overset{\overset{R_1}{|}}{\text{C}} = \overset{\overset{R_2}{|}}{\text{C}} - R_3 \qquad \text{I}$$

wherein the Het represents a 5-membered heterocyclic ring containing at least one ring-nitrogen atom and optionally another hetero atom adjacent thereto and wherein $R_1$, $R_2$ and $R_3$ all represent hydrogen or chlorine with at least one of these substituents being chlorine are made condensing the appropriate heterocyclic ring compound carrying a primary amino group adjacent to the ring with the appropriate chlorine substituted acryloyl chloride in an inert organic solvent. This reaction is exothermic and proceeds quite rapidly, forming the desired acrylamide of Formula I.

In a preferred embodiment, 1 mole of the desired chlorine-substituted acryloyl chloride is reacted with 2 moles of the amino-substituted heterocyclic; this forms 1 mole of the desired acrylamide and one mole of the heterocyclic amino compound as the hydrochloride salt. The latter is insoluble in most organic solvents and, by properly selecting the reaction medium, the desired compound remains in solution while said hydrochloride salt precipitates. The work-up of the reaction mixture is therefore very simple and fast: the precipitate is filtered off and the solvent is evaporated. The N-substituted acrylamide can be recrystallized from various solvents or solvent combinations to produce the pure compound of Formula I.

The new compounds have intraperitoneal $LD_{50}$ values ranging between 300 and 750 mg./kg.; their oral $LD_{50}$ values are about 750 mg./kg.; the antiedema activity of these compounds range from 5 to 30% reduction of edema at doses of 25-100 mg./kg.

The heterocyclic moieties with which this invention is primarily concerned are those 5-membered heterocyclic rings that contain one or two nitrogens in adjacent positions, or, a nitrogen and an oxygen atom in adjacent positions, such as the pyrrolidine, the pyrazolyl or the isoxazolyl moieties which can carry methyl substituents on the ring as well.

In order to illustrate specific embodiments of the present invention, the following examples are given here. These examples are to be understood only to show the preparation of specific compounds of the new series and are not meant to limit the invention in any respect.

EXAMPLE 1

2,3-Dichloro-N-(1,3-dimethyl-5-pyrazolyl)acrylamide

A solution of 15.94 of 2,3-dichloroacryloyl chloride in 50 ml. of N,N-dimethylformamide was added to 22.24 g. of 1,3-dimethyl-5-aminopyrazole dissolved in 100 ml. of N,N-dimethylformamide without cooling. The reaction was exothermic and the mixture was allowed to stand overnight. The insoluble 1,3-dimethyl-5-aminopyrazole hydrochloride was removed by filtration. The filtrate was evaporated to dryness and the residue was treated with 200 ml. of acetone. The last traces of the aminopyrazole hydrochloride were filtered. Removal of the solvent gave an oily residue which was poured into 150 ml. of water. The solid formed was filtered and crystallized once from alcohol/water and once from benzene to produce 16.7 g. of 2,3-dichloro-N-(1,3-dimethyl-5-pyrazolyl)acrylamide melting at 89°–90° C.

EXAMPLE 2

2,3-Dichloro-N-(3-methyl-5-isoxazolyl)acrylamide

A solution of 3.18 g. of 2,3-dichloroacryloyl chloride in 25 ml. of benzene was added to 3.92 g. of 5-amino-3-methylisoxazole dissolved in 75 ml. of benzene. The reaction mixture was stirred for one hour at 25° C. The insoluble 5-amino-3-methylisoxazole hydrochloride was filtered. The filtrate was concentrated to 25 ml. and on cooling, 1.5 g. of 2,3-dichloro-N-(3-methyl-5-isoxazolyl)acrylamide was obtained. After crystallization from benzene, the pure compound was obtained, melting at 143°–4° C.

EXAMPLE 3

2,3,3-Trichloro-N-(3-methyl-5-isoxazolyl)acrylamide

A solution of 3.9 g. of 2,3,3-trichloroacryloyl chloride in 10 ml. of N,N-dimethylformamide was added dropwise to a stirred solution of 3.9 g. of 5-amino-3-methylisoxazole in 20 ml. of N,N-dimethylformamide with cooling. After the addition was complete, the reaction mixture was stirred overnight and poured into 200 ml. of cold water. The solid formed was filtered off and crystallized from alcohol/water to yield 1.1 g. of 2,3,3-trichloro-N-(3-methyl-5-isoxazolyl)acrylamide, melting at 103°–5° C.

EXAMPLE 4

2,3,3-Trichloro-N-(1,3-dimethyl-5-pyrazolyl)acrylamide

A solution of 5.8 g. of 2,3,3-trichloro acryloyl chloride in 30 ml. of N,N-dimethylformamide was added to 6.7 g. of 5-amino-1,3-dimethylpyrazole dissolved in 100 ml. of N,N-dimethylformamide while cooling in an ice bath. After standing overnight, the insoluble hydrochloride salt was filtered and the filtrate was evaporated to dryness. The oily residue was treated with 100 ml. of ether. A semi-solid formed which was filtered and crystallized from alcohol/water to produce 1.8 g. of solid 2,3,3-trichloro-N-(1,3-dimethyl-5-pyrazolyl)acrylamide, melting at 78°–80° C.

EXAMPLE 5

3-Chloro-N-(1,3-dimethyl-5-pyrazolyl)acrylamide

A solution of 2.5 g. of 3-chloroacryloyl chloride to a solution of 4.4 g. of 5-amino-1,3-dimethylpyrazole as described in Example 3 gave 2.4 g. of 3-chloro-N-(1,3-dimethyl-5-pyrazolyl)-acrylamide, melting at 103°–5° C. (alcohol/water).

EXAMPLE 6

The activity of the new compounds described above was established by the following procedure: edema was produced in the paws of rats by the injection of carrageenan according to the method described by Winter et al. (Proc. Soc. Exp. Bioc. Med. 1962, Vol. 111, p. 544). The test compounds were administered orally at various dosages (6 rats per dosage) 30 minutes prior to the administration of the edema-producing carrageenan. Edema size is expressed as percent increase over normal paw size. Edema inhibition is calculated from the difference between the average edema size of a control group of animals and the average edema size of each test group. In this manner, the above compounds showed the following percent reduction in edema size:

TABLE 1

| Compound Of | Dose mg./kg. | Reduction % | I. P. Toxicity mg./kg. |
|---|---|---|---|
| Ex. 1 | 50 | 14% | 300 |
| Ex. 1 | 100 | 22% | 300 |
| Ex. 2 | 50 | 25% | 750 |
| Ex. 3 | 100 | 29% | 750 |
| Ex. 4 | 100 | 4% | 750 |
| Ex. 5 | 100 | 15% | 750 |

The compounds of Formula 1 can be effectively administered orally and some representatives also are efficient through other routes of administration, e.g., through injections or or topical application. For all administration, the compounds can be suspended or dissolved in a pharmaceutically acceptable media or they can be combined with a pharmaceutically acceptable solid carrier for the preparation of pills, capsules, tablets or the like. For either the liquid or solid dosage form, the free base of the above compounds as well as their nontoxic acid addition salts may be used. The preferred salts for this purpose are hydrochloride, sulfate, citrate, phosphate or acetate. These salts may be used alone or a combination of salts may be used to produce specific effects; for instance, readily absorbable salts and slowly dissolving salts may be combined into a product giving fast and long lasting effects, respectively. The salts, of course, may be based on different compounds of Formula I or the free base of one compound may be combined with a salt or another representative of this new class of compounds.

With oral dosage forms, good results are obtained by administering between 25 and 100 mg./kg. to small animals and between 100 and 500 mg./kg. to humans or other large animals. Such dosages can be given in a single administration or they can be broken up into 2-4 doses to be given at 6-12 hour intervals. Therefore, tablets containing 50 to 500 mg. of the active compound of Formula I or a nontoxic acid addition salt thereof provide an excellent regimen for curing inflammations. This activity appears, with most of the above compounds, to operate through an immunological mechanism.

We claim:

1. A compound of the formula:

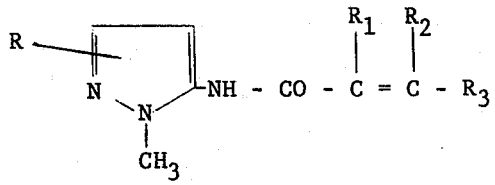

wherein R represents a methyl substituent and wherein $R_1$, $R_2$ and $R_3$ independently represent hydrogen or chlorine with the further proviso that at least one of the substituents $R_1$, $R_2$ or $R_3$ be chlorine or a nontoxic acid addition salt thereof.

2. The compound of claim 1 wherein R represents a methyl group in the 3-position, $R_1$ and $R_2$ are hydrogen and $R_3$ is chlorine.

* * * * *